US009098453B2

(12) United States Patent
Griffith et al.

(10) Patent No.: US 9,098,453 B2
(45) Date of Patent: Aug. 4, 2015

(54) SPECULATIVE RECOVERY USING STORAGE SNAPSHOT IN A CLUSTERED DATABASE

(71) Applicant: International Business Machines Corporation, Armonk, NY (US)

(72) Inventors: Douglas Griffith, Austin, TX (US); Angela Astrid Jaehde, Austin, TX (US); Matthew Ryan Ochs, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 13/940,013

(22) Filed: Jul. 11, 2013

(65) Prior Publication Data

US 2015/0019909 A1    Jan. 15, 2015

(51) Int. Cl.
*G06F 11/00* (2006.01)
*G06F 11/14* (2006.01)
*G06F 11/20* (2006.01)

(52) U.S. Cl.
CPC ........ *G06F 11/1458* (2013.01); *G06F 11/1412* (2013.01); *G06F 11/1469* (2013.01); *G06F 11/1471* (2013.01); *G06F 11/2028* (2013.01)

(58) Field of Classification Search
CPC .................................................. G06F 11/1412
USPC ...................................... 714/15, 16, 2, 20, 41
See application file for complete search history.

(56) References Cited

U.S. PATENT DOCUMENTS

| 7,434,087 | B1 | 10/2008 | Singh |  |
|---|---|---|---|---|
| 2007/0083645 | A1 | 4/2007 | Roeck et al. |  |
| 2007/0245167 | A1 | 10/2007 | De La Cruz et al. |  |
| 2009/0150718 | A1 | 6/2009 | Park et al. |  |
| 2010/0254254 | A1* | 10/2010 | Chan et al. | 370/216 |
| 2011/0071981 | A1* | 3/2011 | Ghosh et al. | 707/634 |
| 2013/0046731 | A1 | 2/2013 | Ghosh et al. |  |
| 2014/0068040 | A1* | 3/2014 | Neti et al. | 709/223 |

OTHER PUBLICATIONS

Yong-Il, J. et al.; "An extendible hashing based recovery method in a shared-nothing spatial database cluster"; Computational Science and its Applications—ICCSA 2006, International Conference Proceedings; pp. 1126-1135, 2006.
IBM; "Tivoli Storage FlashCopy Manager"; IBM Corporation, www.ibm.com/redbooks/SC27-2503-00 . . . ; 2009.

(Continued)

*Primary Examiner* — Dieu-Minh Le
(74) *Attorney, Agent, or Firm* — Garg Law Firm, PLLC; Rakesh Garg; Thomas Tyson

(57) ABSTRACT

A system, and computer program product for recovery in a database are provided in the illustrative embodiments. A failure is detected in a first computing node, the first computing node serving the database in a cluster of computing nodes. A snapshot is created of data of the database. A subset of log entries is applied to the snapshot, the applying modifying the snapshot to result in a modified snapshot. An access of the first computing node to the data of the database is preserved. Responsive to receiving a signal of activity from the first computing node during the applying and after a grace period has elapsed, the applying is aborted such that the first computing node can continue serving the database in the cluster.

7 Claims, 13 Drawing Sheets

(56) References Cited

OTHER PUBLICATIONS

Lawson, S. et al.; "Best Practices for DB2 on z/OS Backup and Recovery"; BMC Software. www.bmc.com.; www.db2expert.com; Jun. 2009.

International Searching Authority, Notification of Transmitial of the International Search Report and the Written Opinion of the International Searching Authority, or the Declaration, Feb. 20, 2015.

* cited by examiner

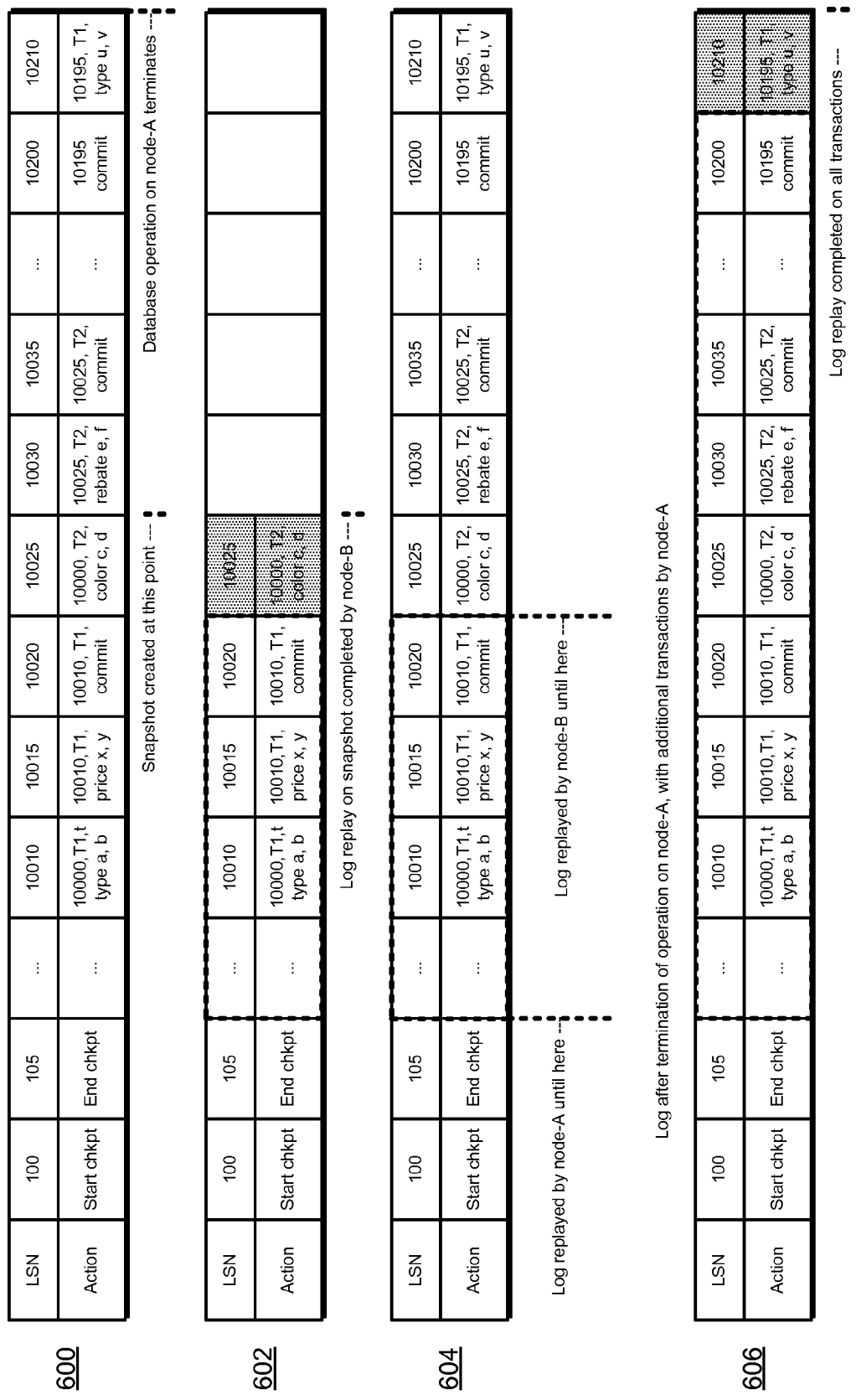

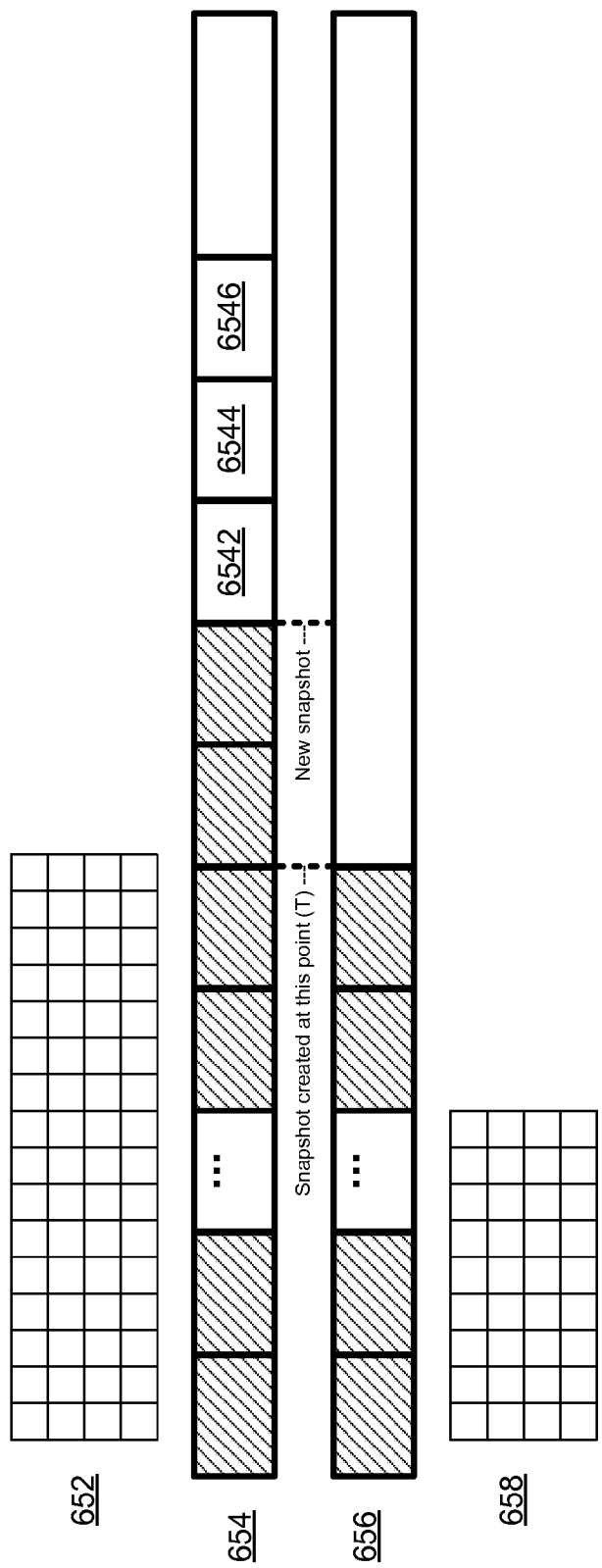

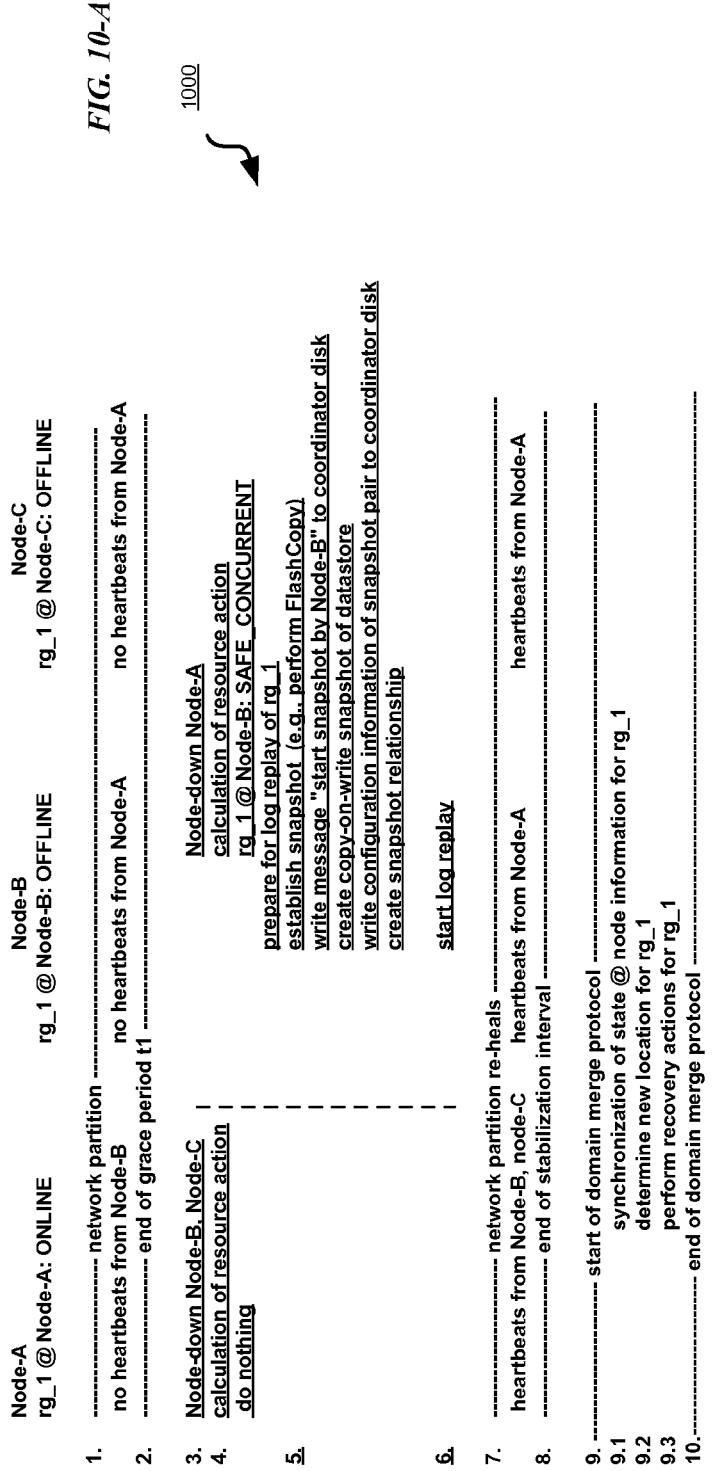
FIG. 10-A

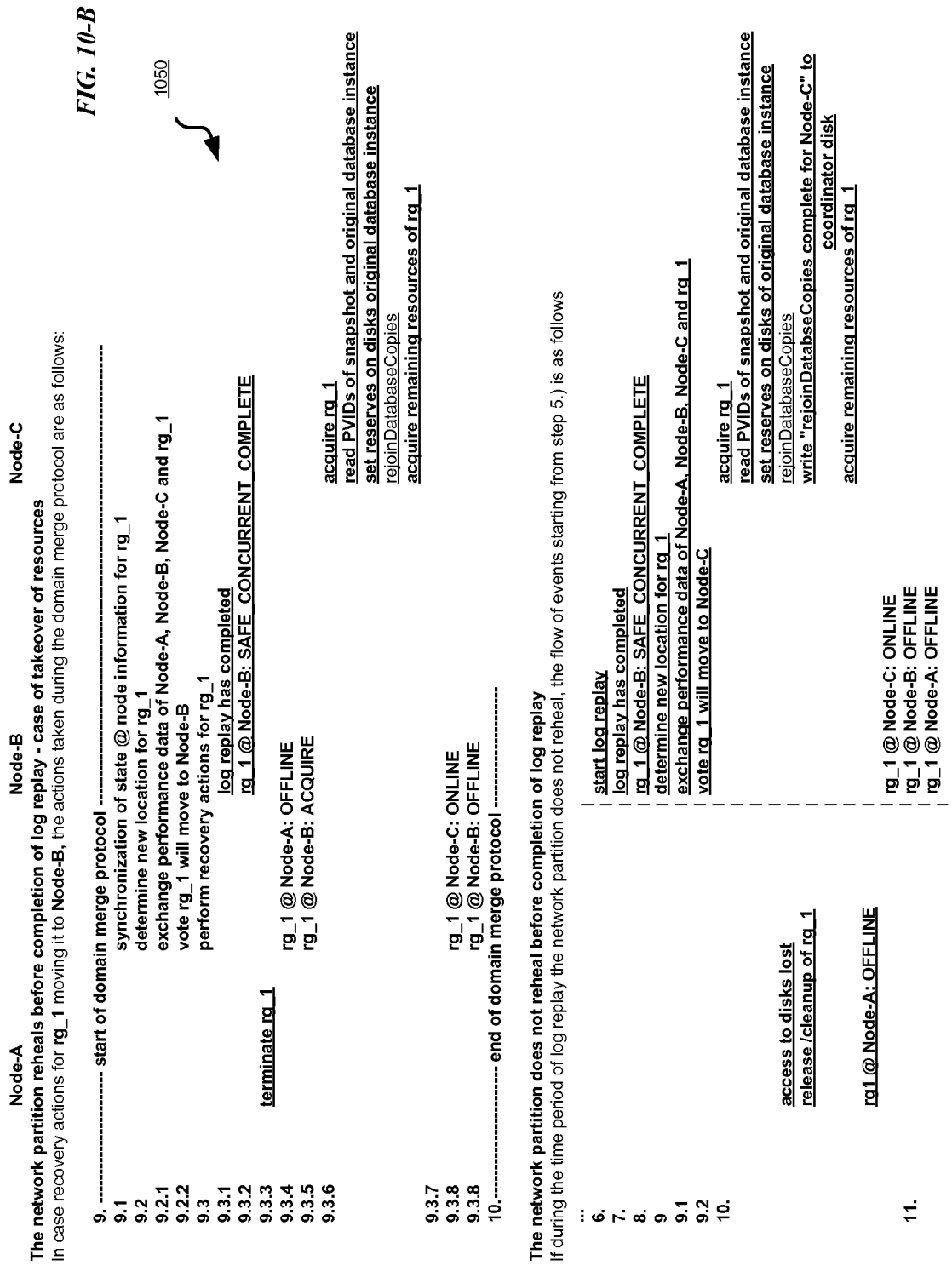
FIG. 10-B

SPECULATIVE RECOVERY USING STORAGE SNAPSHOT IN A CLUSTERED DATABASE

BACKGROUND

1. Technical Field

The present invention relates generally to a system, and computer program product for managing data. More particularly, the present invention relates to a system, and computer program product for speculative recovery using storage snapshot in a clustered database.

2. Description of the Related Art

High availability is a system design that ensures a predetermined level of operational performance during a given period. Architectures for high availability of databases typically have two objectives—protecting the data from storage hardware failures or catastrophic events, and reducing downtime of the database. A clustered architecture is a high availability architecture where multiple servers communicate with each other via shared network paths and cooperate to provide a service.

In a clustered database, computing nodes in a cluster communicate with each other and cooperate to serve a database. The clustered database architecture monitors database operation and performances and performs recovery steps if the database is affected by an error in a clustered node.

An enterprise scale database typically has built-in high availability infrastructure. General disaster recovery infrastructure that is available on server nodes and data storage platforms, such as local or geographic data replication or a high availability clustering, can also be used to implement high availability for a database. The term "disaster recovery" is generally used for fallover between geographically distant sites. For a fallover within a cluster where the nodes are in geographic proximity, such as on the same campus, the term "takeover" is more commonly used for the recovery operation.

SUMMARY

The illustrative embodiments provide a system, and computer program product for speculative recovery using storage snapshot in a clustered database. An embodiment detects a failure in a first computing node, the first computing node serving the database in a cluster of computing nodes. The embodiment creates, using a processor and a memory, a snapshot of data of the database. The embodiment applies, using the processor and the memory, a subset of log entries to the snapshot, the applying modifying the snapshot to result in a modified snapshot. The embodiment preserves an access of the first computing node to the data of the database. The embodiment aborts, responsive to receiving a signal of activity from the first computing node during the applying and after a grace period has elapsed, the applying such that the first computing node can continue serving the database in the cluster.

Another embodiment includes computer usable code for detecting a failure in a first computing node, the first computing node serving the database in a cluster of computing nodes. The embodiment further includes computer usable code for creating, using a processor and a memory, a snapshot of data of the database. The embodiment further includes computer usable code for applying, using the processor and the memory, a subset of log entries to the snapshot, the applying modifying the snapshot to result in a modified snapshot. The embodiment further includes computer usable code for preserving an access of the first computing node to the data of the database. The embodiment further includes computer usable code for aborting, responsive to receiving a signal of activity from the first computing node during the applying and after a grace period has elapsed, the applying such that the first computing node can continue serving the database in the cluster.

Another embodiment includes a storage device including a storage medium, wherein the storage device stores computer usable program code. The embodiment further includes a processor, wherein the processor executes the computer usable program code, and wherein the computer usable program code includes computer usable code for detecting a failure in a first computing node, the first computing node serving the database in a cluster of computing nodes. The computer usable program code further includes computer usable code for creating, using a processor and a memory, a snapshot of data of the database. The computer usable program code further includes computer usable code for applying, using the processor and the memory, a subset of log entries to the snapshot, the applying modifying the snapshot to result in a modified snapshot. The computer usable program code further includes computer usable code for preserving an access of the first computing node to the data of the database. The computer usable program code further includes computer usable code for aborting, responsive to receiving a signal of activity from the first computing node during the applying and after a grace period has elapsed, the applying such that the first computing node can continue serving the database in the cluster.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts an example of log replay in accordance with an illustrative embodiment;

FIG. 6A depicts a block diagram of an example circumstance of a rejoin operation in accordance with an illustrative embodiment;

FIG. 10-A depicts an example sequence of operations in an example high-availability implementation for speculative recovery using storage snapshot in a clustered database in accordance with an illustrative embodiment; and FIG. 10-B depicts an example sequence of operations in an example high-availability implementation for speculative recovery using storage snapshot in a clustered database in accordance with an illustrative embodiment.

DETAILED DESCRIPTION

Figure 1:
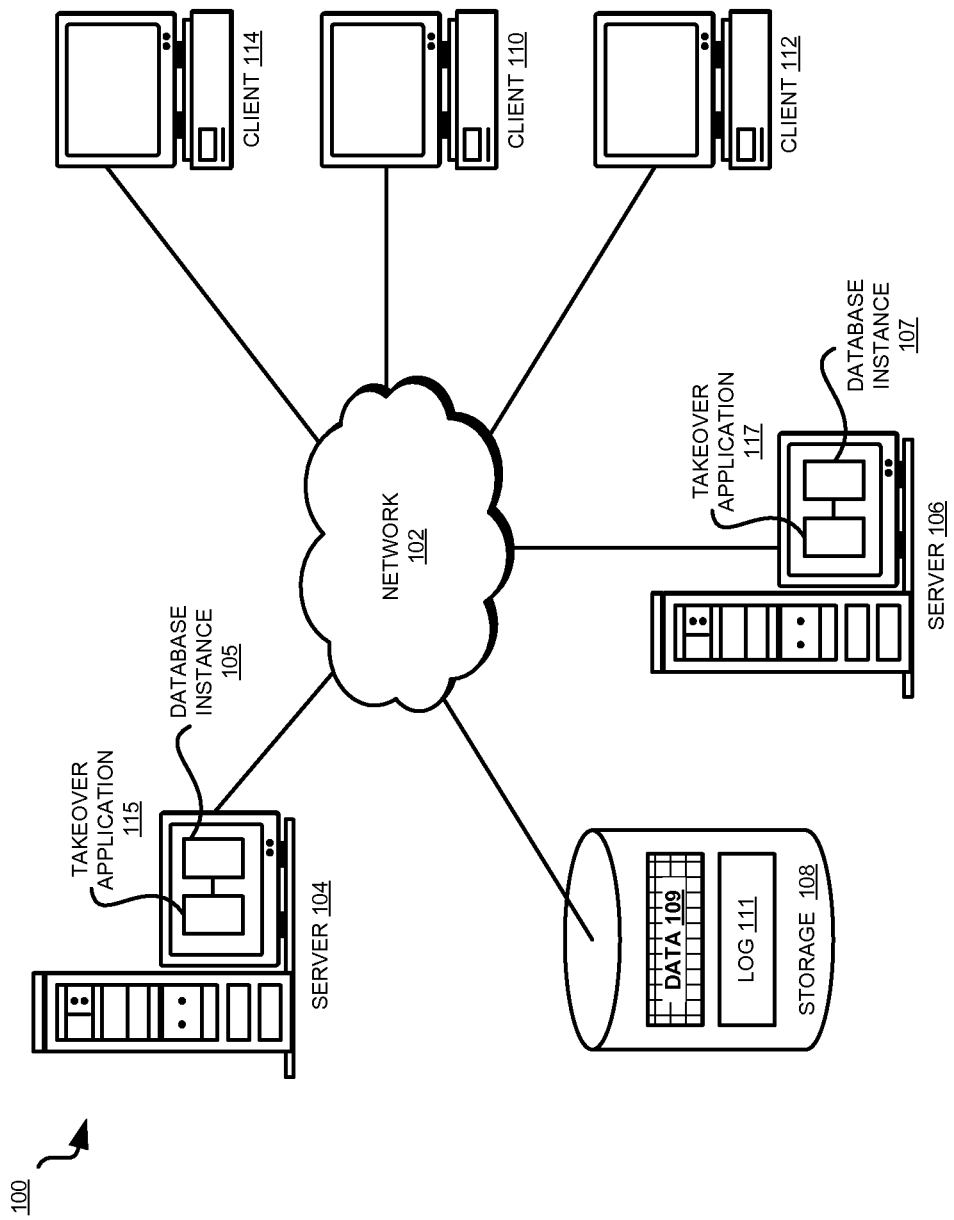
FIG. 1 depicts a block diagram of a network of data processing systems in which illustrative embodiments may be implemented.

In a clustered database, a takeover solution is configured to trigger upon detection of a failure in the primary computing node that is serving the database. The recovery solution initiates a takeover of the database by moving the database serving responsibilities to another node—the takeover node.

The illustrative embodiments recognize that recovery of a database in a clustered environment is resource-intensive, and a computationally expensive operation. The illustrative embodiments further recognize that not all failures detected in a primary node are fatal or non-recoverable failures. Some failures presently detected can be regarded as false failures. A false failure (or a falsely detected failure) is a condition that appears to indicate that the associated computing node is not active where the node is actually active but not performing within certain parameters.

For example, heartbeat is a periodic messaging system amongst clustered computing nodes. A heartbeat sent from a node indicates to other nodes in the cluster that the sending (heartbeating) node is alive and active. If a primary database node fails to send a heartbeat within a designated time-window, a takeover node may conclude that the primary node has become inactive and begin a database recovery operation. The primary node, however, may be alive, but a condition in the node may have prevented the thread that sends the heartbeat from getting the processor time, or a condition in the network may have delayed the heartbeat packet from reaching the takeover node.

The example of heartbeat failure is not the only false failure. Many other false failures can similarly occur in a clustered database environment. The illustrative embodiments recognize that initiating a database recovery operation during false failures is undesirable.

The illustrative embodiments used to describe the invention generally address and solve the above-described problems and other problems related to database recovery in clustered database environments. The illustrative embodiments provide a system, and computer program product for speculative recovery using storage snapshot in a clustered database. The illustrative embodiments are described with respect to a snapshot of database data. The snapshot is a snapshot of a storage volume—a data replication on a storage subsystem layer—hence the reference to the snapshot as a "storage snapshot" herein. In a storage snapshot, all the change tracking and disambiguation of access to the device is resolved on storage layer, within one storage device, immune to the partition of the servers for which the storage device provides storage. A snapshot copy establishes a relationship with the copy source and the target storage device. While a snapshot relationship is active, after the point in time at which the relationship has been initiated, both the source and target may be further modified by applications.

The terms "snapshot" or "storage snapshot" used in this disclosure refer to this generalized concept of data replication on a storage subsystem layer. FlashCopy is an example implementation of a snapshot according to an embodiment as implemented in some clustering systems. Subsequent use of the term "FlashCopy" in this disclosure is used synonymously with the general concept of the storage snapshot, including but not limited to the particular implementation of storage snapshot in a particular cluster configuration.

Presently available takeover solutions for databases can be broadly classified by their data replication techniques, content that is replicated, or mode of synchrony in the replication. Classification according to data replication technique classifies a disaster recover solution depending on whether the database uses data replication on storage subsystem layer, device layer, or on database layer. Classification according to the content that is replicated classifies a disaster recover solution depending on whether the database replicates all data or just the transaction logs.

Classification according to mode of synchrony classifies a disaster recover solution depending on the degree of strictness of completion of an Input/Output (I/O) operation on a remote site before the I/O is declared complete on the local site. The various modes of synchrony include—(i) synchronous, wherein data has to be written to the remote storage before the I/O operation is complete; (ii) near synchronous, where the receipt of data is acknowledged by the process on the remote site; (iii) asynchronous, where a transaction is complete after the transaction data are sent to the process on the remote site without waiting for acknowledgement of receipt; and (iv) super-asynchronous, where a transaction is complete after data has been written to a local buffer from which data are sent to remote site.

Different clustered database setups allow a database daemon instance (other than the primary database instance) different types of access. Some allow read-write, where the daemon instance is allowed to read and write to the datastore in use by the primary database instance. An example of such a configuration is a parallel database where all database instances have read-write access to the data store.

Some other clustered database setups allow read-only access to the daemon instance, where the daemon instance is allowed to read the datastore. An example of such a configuration distributes committed transactions over the network to one or more replica instances.

Some other clustered database setups allow a warm standby, where a database instance performs log replay on a separate database copy that is brought to read-write state in case of failure. Log replay is the process of applying a transaction from a log entry.

Some other clustered database setups allow a cold standby where a high availability cluster node is in standby mode to start a database instance. In such a setup, a resource management infrastructure of the cluster monitors the database and supporting resources on the primary clustered server, so that they can be restarted on another clustered server in case of failure of the primary server. The supporting resources include but are not limited to processors, memory, disks and other devices, file-systems, IP configurations, performance and other system configuration settings to enable an operating environment for the database instance and possibly further applications that depend on the database.

Takeover due to falsely detected failures in clustered high availability architectures for databases causes the takeover database instance to perform a substantial amount of transaction log replay before bringing the database back to an operational state. Transaction log replay is required after an ungraceful termination of the database, which entails a shutdown of the database without writing the in-memory buffers of the database to disk. Before restarting the database, tables need to be reconstructed from the transaction log on disk, which is a slow process due to I/O performance limitations. Depending on the amount of uncommitted transaction log entries, log replay might take anywhere from minutes to hours after ungraceful termination of a database. Whether a given high-performance clustered database architecture uses a low degree of synchrony, a warm standby, or none at all, log replay according to present techniques is guaranteed to take an amount of time that is not negligible.

The illustrative embodiments are described with respect to certain false failures only as examples. Such example failures are not intended to be limiting to the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
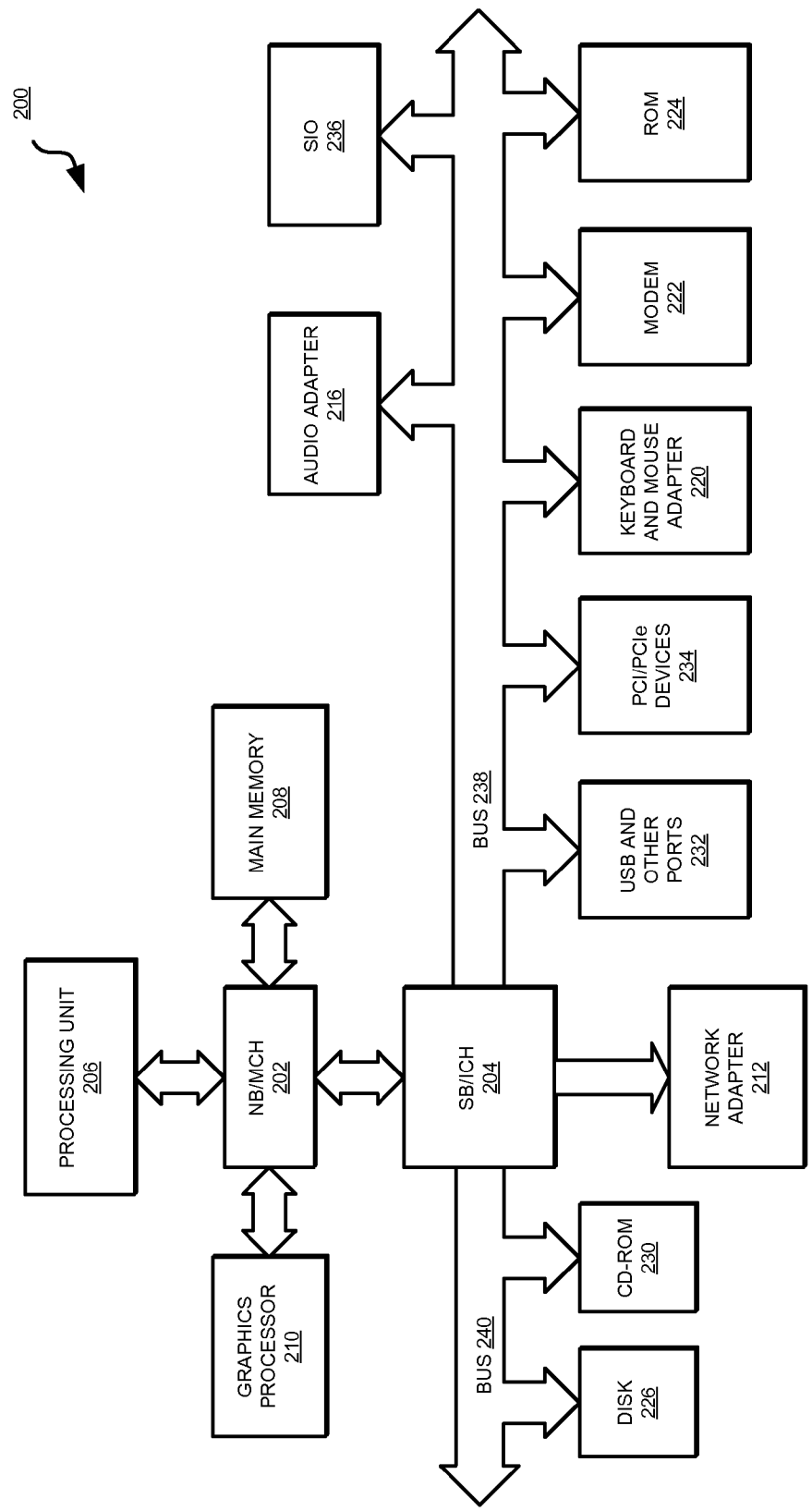
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, database instance 105 in server 104 is an instance of a database application in a clustered database that uses servers 104, server 106, and other data processing systems in a cluster. Database instance 107 is another instance of the database application acting as a takeover instance that operates in server 106, which acts as a takeover node in the cluster. Database instance 105 uses data 109 in storage 108 as the datastore. Storage 108 or an equivalent thereof includes log 111, which is a repository of log entries made by database 105 during processing of database transactions in the primary role. For example, log 111 is usable in a log replay in accordance with an illustrative embodiment. Takeover application 117 includes an implementation of an embodiment described herein. Takeover application 117 operates in conjunction with database instance 107. For example, an existing database application may include, or may be modified or configured to operate in conjunction with, takeover application 117 to perform an operation according to an embodiment described herein. Takeover application 117 enables the takeover of the functions of database instance 105 in server 104 at database instance 107 in server 106. Similarly, when database instance 107 is the primary instance, takeover application 115 enables the takeover of the functions of database instance 107 in server 106 at database instance 105 in server 104.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications, logic, or programs, such as database instances 105 and 107, and takeover application 117 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
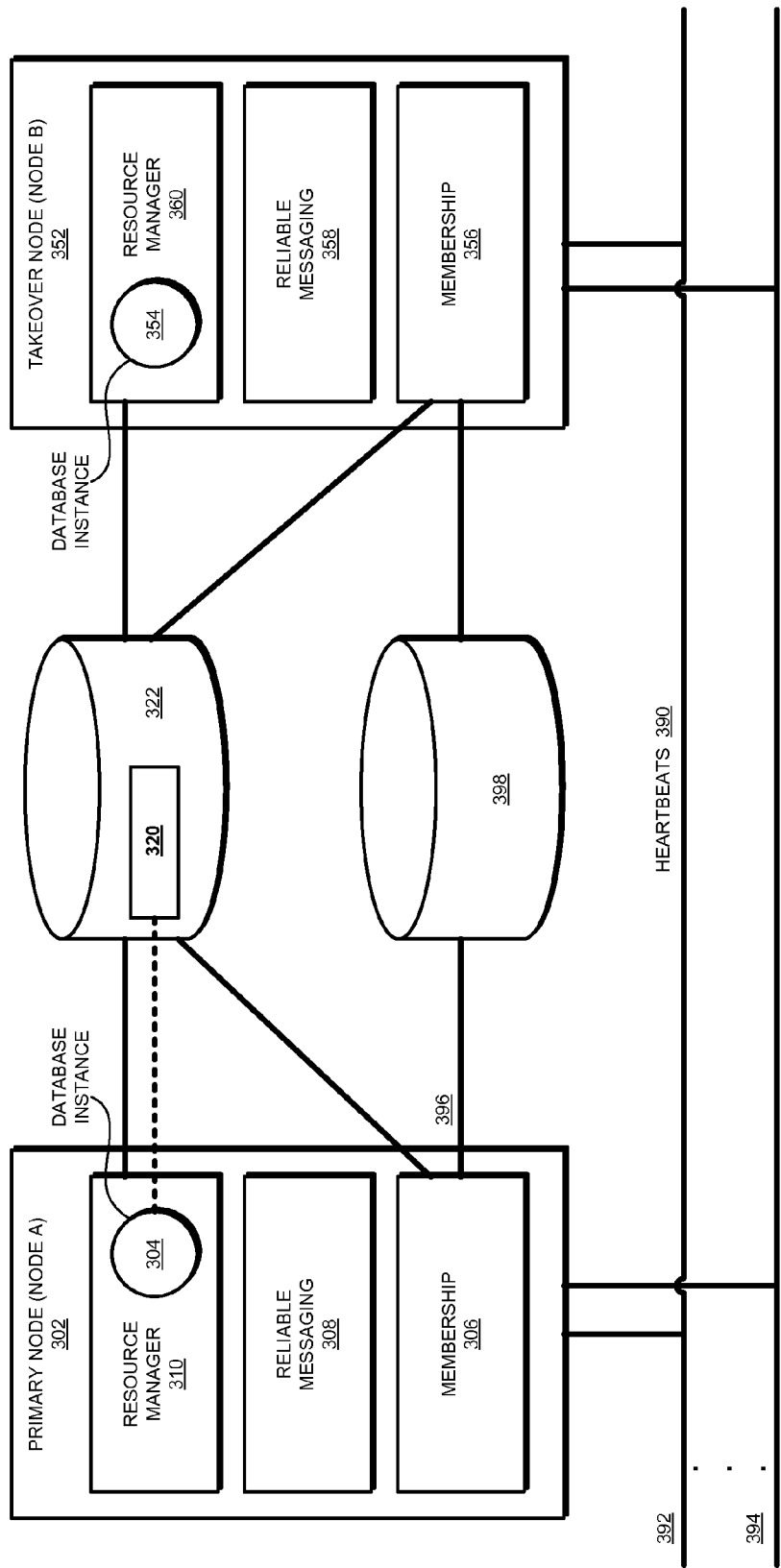
FIG. 3 depicts an example of tabular data within which functional relationships and signatures can be identified in accordance with an illustrative embodiment.

With reference to FIG. 3, this figure depicts a block diagram of a clustered database environment that can be modified by using an illustrative embodiment. Primary node 302, labeled "Node-A" is an embodiment of server 104 in FIG. 1. Primary node 302 hosts database instance 304, which is an example of database instance 105 in FIG. 1. Takeover node 352, labeled "Node-B" is an embodiment of server 106 in FIG. 1. Takeover node 352 hosts database instance 354, which is an example of database instance 107 in Figure.

Any distributed management of a database relies on a clustering infrastructure that provides essential functions in distributed systems, such as detection of member failures, reliable messaging and barrier synchronization. Such infrastructure might be built into the database or the database may rely on clustering services provided as part of a platform infrastructure. FIG. 3 shows a typical component stack of a clustering infrastructure.

Membership component 306 in Node-A and membership component 356 in Node-B each maintains the state of the various nodes in the cluster by sending heartbeats 390 between cluster members, across multiple redundant network connections, e.g., networks 392 and 394. Heartbeats 390 can also travel over paths across storage subsystems, such as path 396 across storage subsystem 398. Reliable messaging components 308 and 358 in Node-A and Node-B, respectively, provide essential functions for distributed systems, such as reliable messaging and barrier synchronization.

Resource manager 310 in Node-A and resource manager 360 in Node-B, using the services of the lower layers, implement distributed resource management in their respective computing nodes. In the case of management of databases, a resource manager, such as resource manager 310, can include functions for relocating or restarting a database instance, such as database instance 304, in response to a failure or performance degradation. Resource managers 310 and 360 also include functions for management of a data stream for replication between two servers, such as between Node-A and Node-B. In one embodiment, resource manager 310 is a built-in component of the database. In another embodiment, resource manager 310 is a stand-alone system such as a set of daemons that provides resource management in a high availability cluster.

Database instance 304 uses data 320 in datastore 322. Data 320 symbolizes the entire data of the database and may occupy any amount of space in datastore 322. Resource managers 310 and 360 manage datastore 322 as a resource, and database instance 354 can use datastore 322 during a takeover. Datastore 322 can also serve as an additional path for heartbeats.

Presently, one cluster node will declare another node as down if the node has not received heartbeats from the other node for a configured maximum time-out, the grace period. Presently, upon declaring a node as down, resource recovery actions will start, which entail relocation of a database instance to another server and other such expensive operations. For example, Node-B might stop receiving heartbeats from Node-A for several reasons—(i) Node-A has crashed, (ii) Node-A is in a state where the threads that send heartbeats do not get timely CPU access, or (iii) all network connections between Node-A and Node-B are severed, permanently or temporarily, for a time span exceeding the grace period.

The illustrative embodiments recognize that scenarios (ii) and (iii) in many circumstances are false failures, i.e. though no heartbeats are received from Node-A, Node-A remains alive, operational, or responsive.

Consider scenario (ii), when Node-A is not able to send heartbeats for a preconfigured grace period. Using a presently available disaster recover solution, Node-B will start to take over resources for serving database instance 304 from Node-A after the expiration of the grace period. Because Node-B has taken over the resources used for serving the database instance 304, Node-A must stop operating database instance 304 and using those resources after the expiration of the grace period. The resource usage at Node-A must stop to prevent uncoordinated operation, such as two instances of databases, to wit, instances 304 and 354, being concurrently active without coordination in the cluster.

A cluster infrastructure that prevents uncoordinated operation of resources typically does so by a deadman switch, which halts a cluster node if heartbeating threads on it have not been able to send heartbeats for the configured grace period. The combination of the grace period and the deadman switch ensures integrity of access of managed cluster resources.

Scenario (iii) is referred to as a partitioned cluster. A premise of any cluster design is that such state should never be reached because a cluster cannot function without network connections to coordinate node actions. A cluster designer is tasked with providing sufficient redundancy of network paths in the cluster domain such that the likelihood of all paths being affected by a failure concurrently is close to zero. In reality, network connections between cluster nodes frequently do not have sufficient redundancy either as a matter of design, or during operation due to operating conditions. In many cases, the condition that caused a failure to receive heartbeats for the configured grace period due to scenario (iii) is temporary.

The illustrative embodiments recognize that scenarios (ii) and (iii) are presently assumed unlikely occurrences and thus not much effort is presently expended in cluster designs to implement optimal resource availability. The deadman switch halts a node, thus terminating all resources for the node if the node cannot send heartbeats. After a partition re-heal, a cluster typically executes a domain merge protocol to reconcile diverging views of resources caused by cluster partition. A domain merge protocol specifies actions and a set of steps to be executed after a cluster partition in order to reconcile the states and information about cluster membership. The domain merge protocol manages resources that might have diverged during the partition and coordinate actions to recover from the concurrent existence of converging states of members and resources, to again arrive at a unified view of the cluster-wide managed resources.

The illustrative embodiments recognize that the halting and reconciling procedures are insufficient, inefficient, and expensive ways of handling failures, particularly false failures. In modern large-scale, complex, cluster domains, thread scheduling aberrations, network partitions, and other reasons for missing a heartbeat are more likely to occur.

The illustrative embodiments recognize that many such reasons or events are very often temporary in nature and often resolve themselves. For example, a temporary network partition might be caused by a network or storage switch reset which typically completes within 2-3 minutes. As another example, with a SCSI I/O time-out of 30 seconds, an event in the storage area network (SAN) that causes the loss of a few Fibre Channel frames might cause a partition that will re-heal shortly thereafter.

With up to 1024 CPUs and more in commonly used cluster hardware, and with hardware virtualization, thread scheduling aberrations are becoming increasingly common. Cases where a crash has been caused by a deadman switch after the default grace period of 20 seconds are common. Such cases can be avoided by an embodiment recognizing and exploiting the knowledge that the condition that caused the grace period to elapse would have resolved on its own within a waiting period. For example, had the deadman switch operation waited for a waiting period, locks would have been released and the blocked threads could have been scheduled again.

At the time the grace period and deadman switch design was conceived, when virtualization and auto-recovery features were not prevalent, halting a node more likely was the right decision when heartbeat threads failed to complete I/O within the grace period. Presently, with more complex thread scheduling than before, and with features such as CPU virtualization and Active Memory Sharing, halting the node is more likely the incorrect response to missing a heartbeat. (Active Memory Sharing is a trademark of International Business Machines Corporation in the United States and in other countries.) The illustrative embodiments recognize that in modern clusters, often the cause for a failure, like the above cause, is temporary, and therefore, a false failure.

The illustrative embodiments also recognize that inherent in the present cluster design and takeover solutions is a single grace period. In other words, presently, the timeout after which a node is declared as down is the same for all cases of failure, whether the failure is due to a node crash, a network partition, or a thread scheduling aberration. While with older technology, assuming the same grace period before declaring a condition as final may have been reasonable, such assumption is incorrect under modern circumstances.

The illustrative embodiments recognize that each failure scenario has its own time-period within which the failure can remedy itself, and after which, to declare the failure as final would be reasonable. For example, in the event of a node crash, the failure can be final immediately, but in the case of a network partition, present self-healing times are of the order of approximately three minutes, before which the failure should not be regarded as final. Similarly, depending on the circumstances in a node, the typical duration of a switch reset or a thread scheduling aberration can be even longer periods. Resource takeover and database relocation are expensive takeover solutions for failures that can turn out to be false failures in much shorter time than the completion of the takeover solution.

The illustrative embodiments further recognize that with increasing sizes of datastores the penalty of an ungraceful termination of a database as a result of a node failure has increased. With memory used to back up internal buffers in ranges up to Terabytes, a database after a crash can spend significant time initializing, populating buffer pools, and completing log replay. Due to performance considerations and implementation costs, many users do not implement warm standby solution with a short synchronization lag.

To provide high-availability in the modern complex infrastructures, that use virtualization and significantly larger datastores, the illustrative embodiments provide recovery mechanisms for handling the changed failure patterns and maintaining acceptable recovery times for enterprise scale databases. Database outages due to unnecessary fallovers from false failures can be avoided by using an embodiment.

Figure 4:
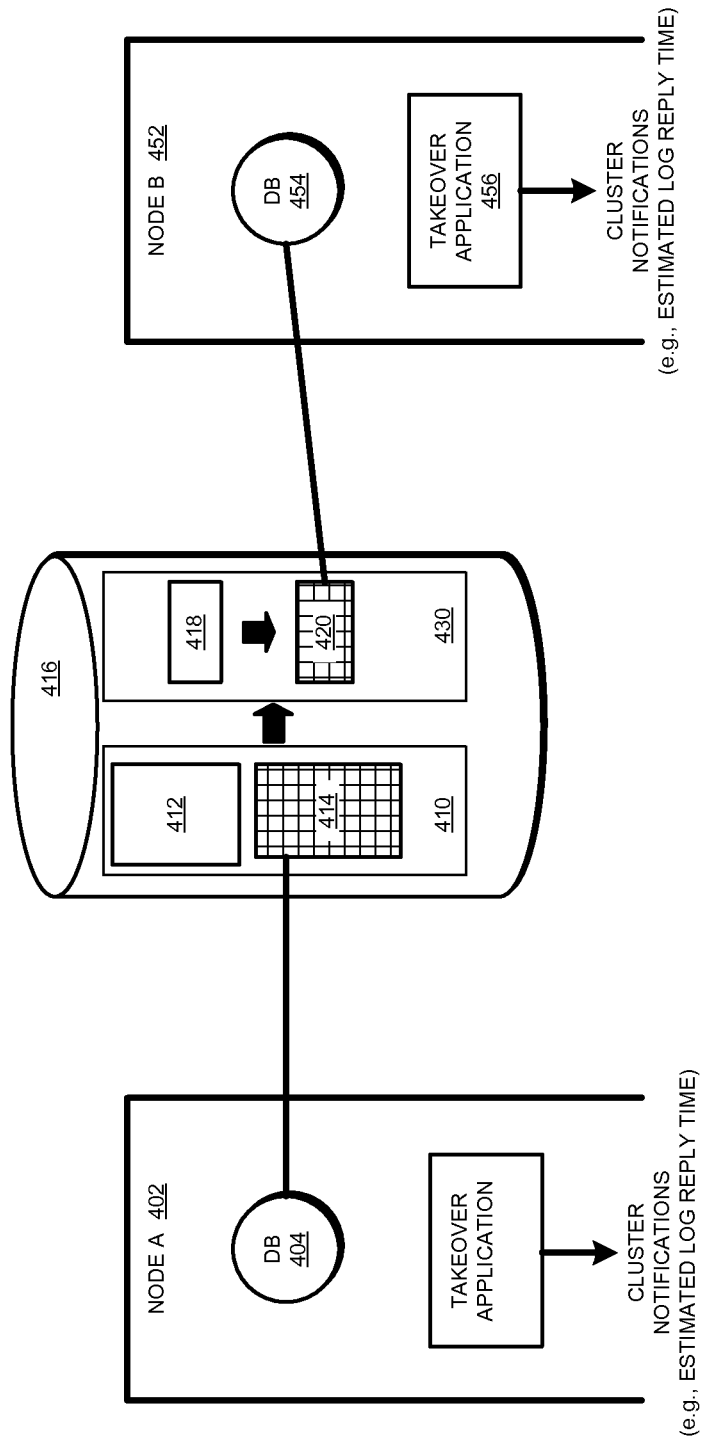
FIG. 4 depicts block diagram of speculative recovery using storage snapshot in a clustered database in accordance with an illustrative embodiment.

With reference to FIG. 4, this figure depicts block diagram of speculative recovery using storage snapshot in a clustered database in accordance with an illustrative embodiment. Node 402 ("Node-A") executing database instance 404 is an example of node 302 executing database instance 304 in FIG. 3. Node 452 ("Node-B") is an example of node 352 in FIG. 3. Data 414 in datastore 410 in data storage device 416 is similar to data 320 in datastore 322 in FIG. 3. Data 410 and data 320 may occupy any amount of space in datastores 430 and 322, respectively.

Log 412 is a record of transactions processed or being processed by database instance 404 using data 414. Database instance 404 reads and writes log 412 and data 414 while operating.

Assume that Node-B detects a failure in Node-A, such as a missed heartbeat from Node-A upon the elapse of a predetermined grace period. Upon detecting the failure, prior-art methods would terminate resource access of Node-A, initiate a resource fallover to Node-B, and initiate a prior-art takeover operation.

In contrast, an embodiment, implemented as takeover application 456, does not terminate the access of Node-A to the resources, including database instance 404's access to data 414. Instead, takeover application 456 creates snapshot datastore 430 of datastore 410. The process of creating snapshot datastore 430 from data 410 creates snapshot 420 from data 414 and also builds log 418 from log 412. For example, log 418 starts at some point in log 412 and then is populated as log 412 receives additional entries. In one embodiment, log 418 already exists and is modified by the snapshot creating process.

In one embodiment, snapshot datastore 430 is a data replication on storage subsystem layer. Furthermore, in an embodiment, snapshot datastore 430 is a "copy on write" replication of datastore 410, making snapshot datastore 430 significantly smaller than data 410 at the time of the replication. The compact size of snapshot datastore 430 also allows the replication to be several orders of magnitude faster than a full data replication. Copy-on-write allows database instance 404 to continue to manipulate datastore 410, allows database instance 454 to manipulate snapshot datastore 430, and copies only those data storage blocks between datastore 410 and snapshot datastore 430 that change due to database instances' activities. Blocks in datastore 410 that are to be changed by Node-A are replicated before Node-B uses those blocks from snapshot datastore 430, or blocks that are written to by Node-B to snapshot datastore 430 are replicated to datastore 410 if they are not yet part of snapshot datastore 430.

Other embodiments can use other modes for making the snapshot copy. There are many flavors of snapshot modes, such as split mirror, copy on write, incremental copy, redirect on write, and equivalents thereof. Different implementations implement these modes by other names but with similar principles of operation. An embodiment can implement a snapshot using any such mode. A preferred embodiment uses the copy on write mode to achieve a performance advantage over the other modes.

Takeover application 456, and generally any other embodiments of takeover application 115 and 117 of FIG. 1 referenced in this disclosure, can be implemented in any suitable form in a given environment. For example, in one embodiment, takeover application 456 takes the form of a "Takeover Manager" or "Recovery Manager", which is a component of resource manager 354 in FIG. 3. In another embodiment, takeover application 456 is a component of a distributed database with built-in recovery capabilities that drives necessary actions in response to a failure.

In one embodiment, at a time prior to Node-B performing the transaction log replay operation, Node-A estimates, such as by using a version of takeover application 115 in FIG. 1, a time that the log replay is likely to take until every log entry in log 418 is applied to a snapshot, such as to tables 420 in snapshot datastore 430. Node-A notifies the cluster infrastructure of the estimate in the form of a tunable or changeable waiting time before which Node-A's access to resources should not be terminated.

In another embodiment, with suitably timed coordination within the cluster at a time prior to performing the transaction log replay operation, takeover application 456 estimates a time that the log replay is likely to take until every log entry in log 418 is applied to tables 420 in snapshot datastore 430. Takeover application 456 notifies any further active cluster nodes it can communicate with about this estimated time before the concurrency begins. Takeover application 406 on Node-A periodically notifies the cluster infrastructure of the estimate in the form of a tunable or changeable waiting time before Node-A's access to resources should not be terminated.

Takeover application 456, in conjunction with database instance 454, begins a transaction log replay operation (also referred to herein as applying the log entries) from log 418 to tables 420 in snapshot datastore 430.

Allowing Node-A to retain access to allocated resources and allowing database instance 404 to retain access to data 414 does not create a contention because database instance 454, while concurrent with database instance 404, uses snapshot datastore 430 for reading and writing.

This procedure defers the irreversible and expensive actions for recovery of clustered databases in response to a failure, counting on the possibility that the failure was a false failure, such as missed heartbeats from Node-A due to temporary conditions that are recoverable. The embodiment leverages the knowledge that many conditions that cause failures, such as Node-B not receiving heartbeats from Node-A, are temporary and resolve on their own.

If the failure condition resolves itself, such as if heartbeats from non-heartbeating Node-A resume within the waiting time, while actions taken in the course of recovery are still reversible, that means before Node-B has finished log replay and the recovery manager on Node-B revoked disk access for Node-A, the recovery operation can simply be aborted and database instance 404 remains undisturbed on Node-A that currently hosts the primary instance of the database application. Such a procedure according to an embodiment is particularly useful in scenarios where the database might require a significant amount of time to become operational after an ungraceful termination, such as in architectures where the number of unprocessed entries in the transaction log is significant.

If the failure condition does not correct itself, such as if heartbeats do not resume from Node-A, Node-B—the takeover node—performs log replay on snapshot 420 of data 414, created at the time of detecting the failure. Access to datastore 410 from Node-A is preserved and database instance 404 can still process transactions using datastore 410. If the condition that caused the failure resolves on its own or by manual intervention before transaction log replay by Node-B has completed, i.e., during the waiting time, recovery actions are aborted while never having disturbed the operation of database instance 404 on Node-A.

In case the failure is permanent, e.g., when Node-A fails to transmit heartbeats after the waiting period as well, takeover application 456 performs further takeover actions for the database after the records present in log 418 are applied to snapshot tables 420 in snapshot datastore 430. One such further action applies the changes in snapshot datastore 430 to datastore 410.

In other words, takeover application 456 restructures the recovery actions such that the most time consuming part, log replay, occurs while maintaining operation of database instance 404 undisturbed on Node-A, counting on the possibility that the failure is a false failure and the condition causing the false failure is resolved while log replay on snapshot tables 420 is still ongoing. In the worst case scenario of using an embodiment, the recovery time in case of a permanent failure in the cluster remains comparable to the recovery time by using a prior art method of takeover.

According to one embodiment, other actions for the takeover of the database after a permanent failure are as follows—after having finished the log replay on snapshot tables 420, Node-B disrupts disk access for Node-A, such as by setting reserves on storage 416. An embodiment recognizes that database instance 404 might have still been operational on Node-A and may have added further entries to the transaction log after snapshot datastore 430 was created. The two images of the database, sparsely populated log-applied snapshot 420 and data 414 as modified by database instance 404 during Node-B's log replay, are rejoined. The rejoining preserves the changes made by Node-B during the log replay as well as any transaction records Node-A might have added to data 414 after the creation of snapshot 420. Node-B replays, such as via a function of takeover application 456, these still uncommitted records from the log replay. Node-B acquires remaining resources from Node-A for database operation, and bring the database to an operational state, ready to process requests.

Thus, at the expense of some extra disk space and a slight I/O performance impact while snapshot 420 is being used, an embodiment achieves an elastic time window, with the length of the window being anywhere between the grace period and the time to complete the log replay, for the decision on the right recovery action, i.e., whether to leave database instance 404 active on Node-A or instead activate database instance 454 on Node-B.

An embodiment can select as the waiting time, any length of time from the grace period up to the time to apply all the log entries to snapshot tables 420. Generally, the larger the database, the more time is needed for the log replay, the costlier is the fallover, and the longer the time window possible during which the failure condition might correct on its own or might be resolved by manual or automated troubleshooting.

In the case of a failure to send heartbeats due to thread scheduling aberration, the embodiment does not halt the affected node immediately after the grace period has elapsed. An embodiment uses the cluster barrier protocol or the waiting time window to make the determination whether to halt the affected node later than the grace period.

While the embodiments have been described with respect to one database instance being active at a given time, such configuration is not intended to be limiting on the illustrative embodiments. Concurrency of an embodiment can be applied to other architectures of clustered databases, for example, where Node-A and Node-B access the same datastore via a common SAN.

For example, in one embodiment, the failure occurs when the heartbeats from Node-A are not received at Node-B. In this embodiment, database instance 404 is the active database server and has read-write access to datastore 410. Node-B and database instance 454 thereon acts as a warm standby. Upon detecting degraded performance or failure at Node-A, without disturbing Node-A's access to datastore 410, Node-B begins operating as a warm-backup by applying/replaying the entries from log 418 to snapshot tables 420 as described above.

As another example, in one embodiment, the failure occurs when the heartbeats from Node-A are not received at Node-B. In this embodiment, database instance 404 is acting as a warm standby and has read-write access to datastore 410. Node-B and database instance 454 thereon acts as a backup warm standby. Without disturbing Node-A's access to datastore 410, Node-B begins operating by applying/replaying the entries from log 418 to snapshot tables 420 as described above. Generally, and without limitation, an embodiment is usable in any configuration of database instances 404 and 454, where, in the prior-art, database instance 454 would be considered for taking over database instance 404's responsibilities due to a detected failure in Node-A.

Figure 5:
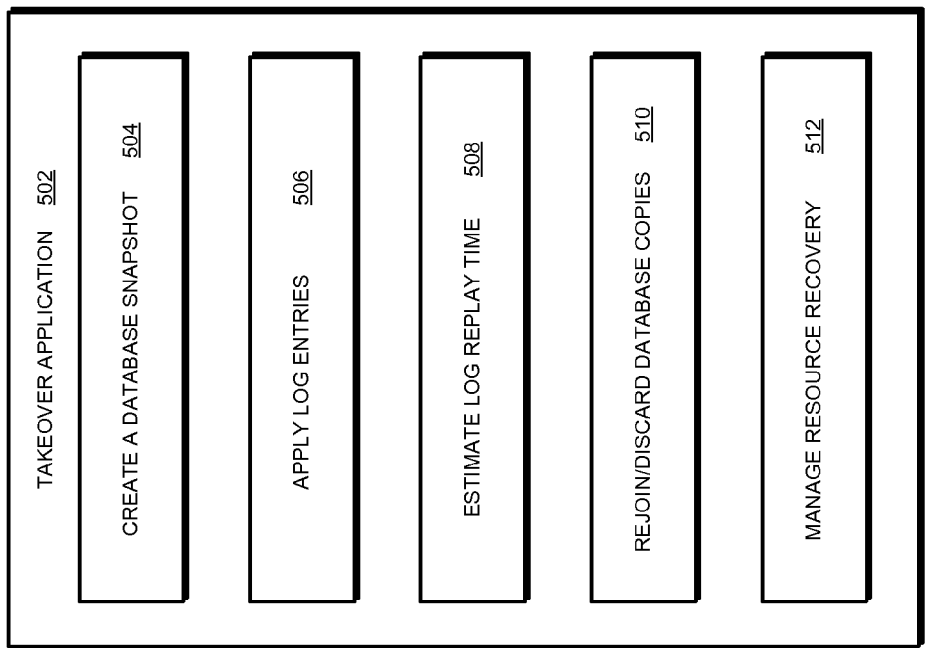
FIG. 5 depicts a block diagram of example functionality in a takeover application for speculative recovery using storage snapshot in a clustered database in accordance with an illustrative embodiment.

With reference to FIG. 5, this figure depicts a block diagram of example functionality in a takeover application for speculative recovery using storage snapshot in a clustered database in accordance with an illustrative embodiment. Takeover application 502 can be implemented as takeover application 456 in FIG. 4.

Component 504 creates a snapshot of an original database image, such as by creating snapshot 430 of data 410 in FIG. 4. When a takeover node, such as Node-B, initiates creation of a snapshot, component 504 issues commands for the creation of a snapshot-to-database-image relationship. Component 504 writes the information about the snapshot-database image pair to a disk. In one embodiment, each cluster node has a dedicated location where to store snapshot-database image relationships created by that node and no conflicts occur due to concurrent access by multiple nodes.

In one embodiment, a cluster-wide known disk is configured to store information about established snapshot-database image relationships. Such a configuration allows more than one node to perform recovery actions in case of multiple failures. Such a configuration also permits performing the log replay in a distributed manner.

Component 506 replays transaction records logged into a log record to the snapshot, such as in a log replay of the log entries from log 418 in FIG. 4 to snapshot tables 420 in snapshot datastore 430 in FIG. 4. Component 508 estimates an amount of time the log replay operation is going to take.

Component 510 rejoins or discards the database copies, such as by rejoining data 410 as modified by Node-A with snapshot datastore 430 as modified by Node-B, or discarding snapshot datastore 430. The rejoin and discard operation are described in detail with respect to FIG. 6.

Component 512 manages the resource recovery during the takeover. For example, when Node-B is operational, and is performing log replay on snapshot tables 420, both Node-A and Node-B are operations concurrently in the cluster.

For example, when Node-B is operational and has completed log replay on snapshot tables 420, component 512 establishes whether the waiting period (also known as a resource grace period), which started at the expiration of the grace period, has been met or exceeded. If Node-B receives heartbeats from Node-A again and determines that Node-A is again a part of the cluster domain for reliable messaging, component 512 initiates further recovery steps, such as initiating the abandonment of snapshot datastore 430, ending the concurrency of Node-A and Node-B, and allowing Node-A to resume the primary role in the cluster. On the other hand, if upon completion of the log replay operation component 512 determines that Node-A is still not a part of the reliable messaging in the cluster domain, component 512 waits for the expiration of the waiting period before initiating further recovery steps.

Without implying any limitation thereto on the illustrative embodiments, one example operation of an embodiment is now described to illustrate the above described functions. Node-A determines, such as by using an equivalent of component 512 in Node-A, the waiting period before the recovery actions start at Node-B. Node-A communicates the waiting period to other cluster nodes while Node-A can still communicate with those other nodes in the cluster. The resource manager in Node-A, such as resource manager 304 in FIG. 3 or a sub-component thereof on Node-A, periodically queries the database resource used by Node-A for the waiting period. Alternatively, the database resource supplies the waiting period information to an API to the resource manager. Based upon Node-A's projections of Node-A's own state, the length of Node-A's transaction log file, and using a recent or historic values for the speed of log replay which depends on the I/O speed and the nature of the log entries, the database resource of Node-A publishes a value for the estimated duration of log replay.

The recovery manager of Node-A uses the value published by the database resource to set an estimated waiting period. A component in Node-A, such as a combination of components 306, 208, and 310 in FIG. 3, communicates the estimated waiting period to all alive members of the cluster, such as by using a synchronization protocol in the cluster. In one example operation, once all alive cluster members acknowledge the estimated waiting period, these other members use the estimated waiting period in the following example manner—a node, such as Node-B, that is deemed to be the takeover node for the database, after completion of log replay on the snapshot will wait at least for the waiting period, counting from the begin of recovery actions, before progressing with the next step in recovery actions; a node, such as Node-A, that has not been able to send heartbeats for the duration of the sum of the grace period and waiting period, either has the I/O suspended, or halts by the operation of the deadman switch.

In one embodiment, the waiting period is the last value that is successfully communicated to both the takeover node and the node assumed as failed. Barrier synchronization protocols of the reliable messaging layer provide that any given node in the cluster can know if another node received and acknowledged a notification.

Thus, the takeover node and the node detected as failed are in agreement on actions regarding the avoidance of duplicate resource acquisition. The node detected as failed will halt before the takeover node takes over.

One embodiment tunes the waiting period based on several input factors. Some example factors include the estimated duration of a network outage due to a switch reset, and a configured I/O time-out. It is generally abnormal for a thread to not execute within a period longer than these factors. For example, an example formula for determining the waiting period may take as a minimum the expected time for a switch reset, and may cap the waiting period at a large value, e.g., 30 minutes. Another example formula may only consider the estimated duration of log replay. The above-described factors, formulae, and conditions are only examples and do not imply a limitation on the illustrative embodiments. Many other factors, formulae, and conditions can be recognized based on this disclosure by those of ordinary skill in the art and the same are contemplated within the scope of the illustrative embodiments.

With reference to FIG. 6, this figure depicts an example of log replay in accordance with an illustrative embodiment. Log 600 depicts log entries that are recorded in log 418 in FIG. 4.

Log 600 is a snippet of a database log at various stages of resource group recovery after takeover has started according to an embodiment. Log 600 shows the content of log 418 on the original on-disk representation of the database, written by Node-A 402 in FIG. 4, up to termination of access of Node-A to storage 416 in FIG. 4. Only as an example, and without implying any limitation there from on the illustrative embodiments, log 600 starts with entries Log Serial Number (LSN) 100 and 105, indicating the completion of a checkpoint operation in database terminology. For example, LSN 100 and 105 for a DB2 database correspond to synchronizing the buffer pools (DB2 is a trademark of International Business Machines Corporation in the United States and in other countries.)

In view 602 of log 600, in the midst of Node-A writing a transaction record starting at LSN 10025, snapshot tables 420 in FIG. 4 is created as the beginning of a takeover event and contains the log up to LSN 10025. Log replay operation on snapshot tables 420 commits records up to LSN 10020 and discards LSN 10025 because LSN 10025 belongs to an incomplete transaction on snapshot tables 420.

View 604 of log 600 shows the condition of log 600 after database operation has been terminated on Node-A and Node-B has acquired access to the original on-disk image of datastore 410. An embodiment, such as component 506 in FIG. 5, compares the LSNs of the committed records and finds that LSN 105 has been committed on the original database image, datastore 410 maintained by Node-A. The embodiment also finds that after LSN 105 and up to LSN 10020, the entries have been committed on snapshot tables 420 maintained by node-B.

The embodiment, such as component 506, determines that further log entries or records, after LSN 10020, have been added by node-A after snapshot datastore 430 was created and have to be replayed/applied to snapshot tables 420, starting with LSN 10025 until the end, LSN 10210. In view 606 of log 600, the embodiment, such as component 506, replays/applies to snapshot tables 420, the log entries starting with LSN 10025 until the end, LSN 10210. Thus, the embodiment ensures that no transactions are lost by log replay on snapshot tables 420.

Log replay on snapshot 420 according to an embodiment works just as well for circular logs that are sometimes used in database implementations. If log 600 is circular, the number of unprocessed records is bound by the log length that cannot be exceeded. An embodiment, such as component 510 in FIG. 5, rejoins database copies, to wit, data 414 and snapshot 420 as modified by Node-A and Node-B, respectively. The rejoin operation commits the changes to the database image obtained by log replay on snapshot 420 to the original image, data 414 as modified by Node-A. The rejoin operation also works for circular logs as long as the circular logs use a unique LSN for each transaction after a checkpoint.

With reference to FIG. 6A, this figure depicts a block diagram of an example circumstance of a rejoin operation in accordance with an illustrative embodiment. The rejoin operation depicted in FIG. 6A can be implemented in component 510 in FIG. 5. Tables 652 is an example of data 414 accessed by Node-A in FIG. 4, log 654 is an example of transaction log 412 written by Node-A in FIG. 4, log 656 is an example of transaction log 418 created by Node-B during the snapshot creation in FIG. 4, and tables 658 is an example of snapshot tables 420 created by Node-B in FIG. 4. The shaded blocks in transaction log 654 and 656 are log entries that have been processed and committed to their respective tables by the respective nodes. Blocks 6542, 6544 and 6546 in log 654 are transaction log entries that have been added to the log yet have not been replayed.

A snapshot of tables 652 and transaction log 654 is taken at time T as shown in FIG. 6A. By the time Node-B has evaluated all entries of transaction log 656, the state in which the log is shown in FIG. 6A, Node-A has not only added further entries to transaction log 654 but also committed additional log entries to tables 652 further than Node-B has in tables 658.

Accordingly, the snapshot of time T is discarded, and Node-B processes those transaction log entries in transaction log 654 that Node-A has not committed yet to tables 652. Alternatively, a new snapshot of tables 652 and transaction log 654 is taken and Node-B processes uncommitted log entries 6542, 6544 an 6546 on a new version of tables 658.

Figure 6B:
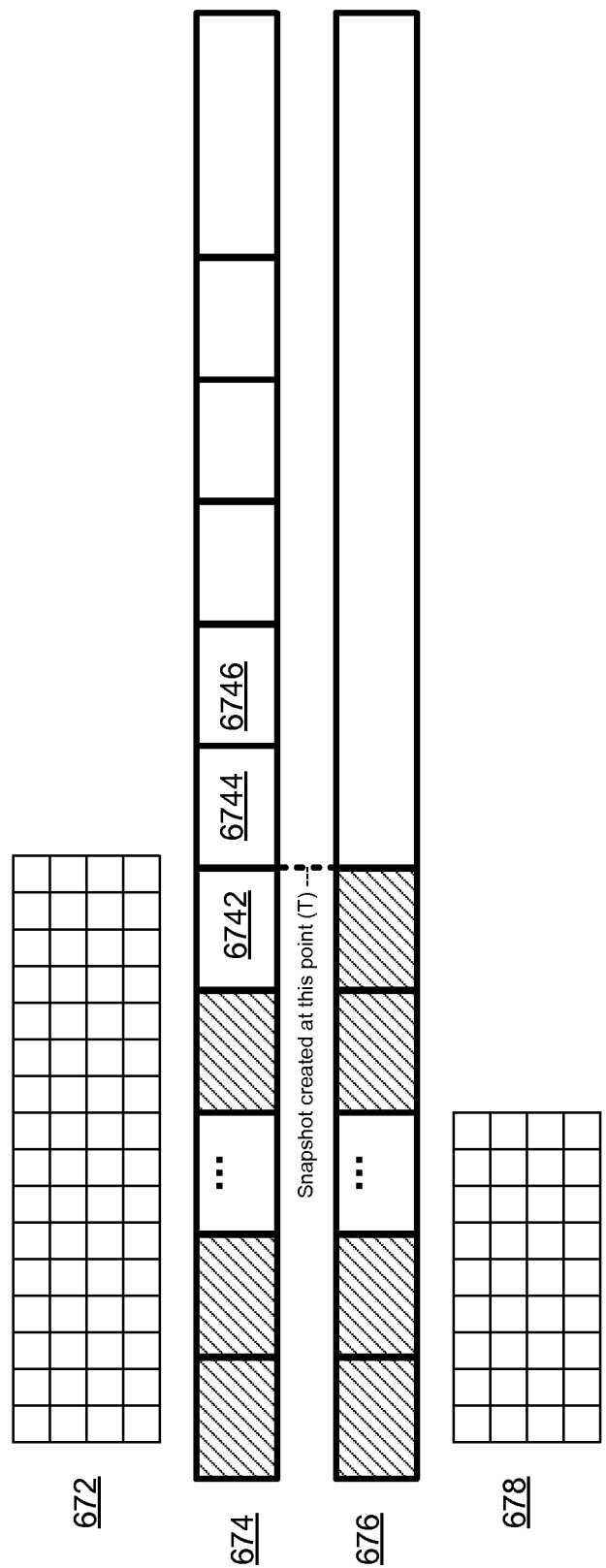
FIG. 6B depicts a block diagram of another example circumstance of a rejoin operation in accordance with an illustrative embodiment.

With reference to FIG. 6B, this figure depicts a block diagram of another example circumstance of a rejoin operation in accordance with an illustrative embodiment. The rejoin operation depicted in FIG. 6B can be implemented in component 510 in FIG. 5. Tables 672 is an example of data 414 accessed by Node-A in FIG. 4, log 674 is an example of transaction log 412 written by Node-A in FIG. 4, log 676 is an example of transaction log 418 created by Node-B during the snapshot creation in FIG. 4, and tables 678 is an example of snapshot tables 420 created by Node-B in FIG. 4. Thus, log 674 and tables 672 form datastore 410, and log 767 and table 678 constitute snapshot datastore 430. The shaded blocks in transaction log 674 and 676 are log entries that have been processed and committed to their respective tables by the respective nodes.

A snapshot of tables 672 and transaction log 674 is taken at time T as shown in FIG. 6B and Node-B starts log replay. By the time Node-B has processed all entries of transaction log 676, Node-A has added further log entries to transaction log 674, but Node-A's internal table processing has not committed transaction log entries as far as Node-B, when Node-B reaches the end of processing of transaction log entries that are present in the snapshot. In FIG. 6B, log entry 6742 has been added before snapshot creation and thus is contained in log 676. An additional sequence of transaction log entries, starting with an entry referenced by 6744 and ending with 6746 has been added by Node-A after creation of the snapshot. When Node-B has processed all transaction log entries present in log 676 in the snapshot, log entry 6742 not been processed by Node-A and also a sequence of additional entries starting with entry 6744 and ending with entry 6746 has been added by Node-A.

Node-B reads the additional log entries, for example entries starting from entry 6742 and ending at entry 6744 that have been added by Node-A to transaction log 674 and copies these entries to the end of transaction log 676 in a process known as log shipping. When all additional entries from transaction log 674 have been added to transaction log 676, Node-B performs log replay on log 676 and tables 678, while the snapshot relationship between data 410 and 430 exists.

An embodiment then performs reverse copy of log-replayed tables 678 back to tables 672 and also reverse copy of transaction log 676 back to log 674. The result is the same like Node-A having performed log replay on datastore 410. Generally, reverse copy of a snapshot performs a block-wise copy of the data of the target device of a snapshot (snapshot datastore 430) back to the source (datastore 410), and is typically performed after changes are made to the target device.

Alternatively, another embodiment performs the reverse copy after log shipping, and then performs log replay on tables 672. This alternative method of the rejoin operation also gives the same results, like having performed the log replay operation on Node-A. FIGS. 6A and 6B describe the actions to perform to re-join the data of the snapshot image with the data maintained by Node-A for different states of the transaction log maintained by Node-A. As will be understood by one skilled in the art, the outlined techniques ensure that the re-join of the snapshot with the data maintained by Node-A preserves all entries added to the transaction log by Node-A in all cases. No transaction is lost in the data image obtained by a combination of log replay on the snapshot, log shipping of entries and reverse copy of a snapshot image. It is the combination of properties of snapshot reverse copy and transaction log replay (the "repeating history property") that ensure that the database image obtained in the described way is the same which would be obtained by performing log replay on Node-A.

Figure 7:
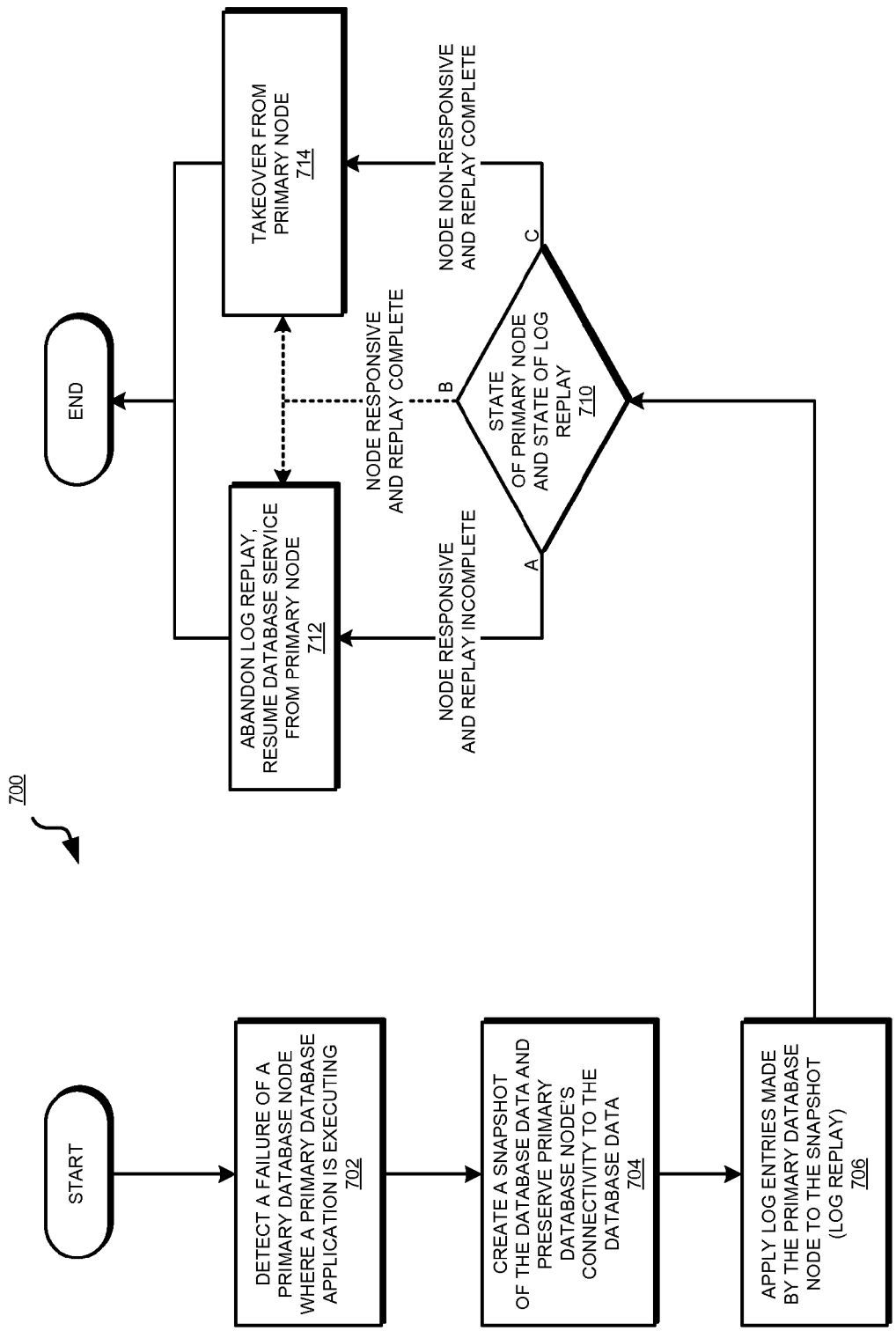
FIG. 7 depicts a flowchart of an example process of speculative recovery using storage snapshot in a clustered database in accordance with an illustrative embodiment.

With reference to FIG. 7, this figure depicts a flowchart of an example process of speculative recovery using storage snapshot in a clustered database in accordance with an illustrative embodiment. Process 700 can be implemented in takeover application 502 in FIG. 5.

A takeover application, operating in conjunction with a database instance according to an embodiment, begins by detecting a failure of a database node, such as a node that is hosting a currently active database instance, (primary database node hosting a primary database instance) (step 702). The takeover application creates a snapshot of the database data while preserving the primary database node's connectivity to the database data (step 704).

The takeover application applies to the snapshot the log entries made by the primary database node, for example, in a log replay operation (step 706). In one embodiment, the takeover application considers the log entries made up to the point of creating the snapshot in step 706.

The takeover application considers the state of the primary database node and the state of the log replay (step 710). In one embodiment, if the primary database node is responsive again and the log replay is yet incomplete ("A" path of step 710), the takeover application abandons the log replay and resumes database service from the primary database node (step 712).

In one embodiment, if the primary database node is responsive again and the log replay has been completed ("B" path of step 710), the takeover application abandons the log replay and resume database service from the primary database node at step 712. In another embodiment, if the primary database node is responsive again and the log replay has been completed ("B" path of step 710), the takeover application proceeds to take over from the primary database node (step 714). In one embodiment, if the primary database node is still non-responsive at the time the log replay has been completed ("C" path of step 710), the takeover application proceeds to take over from the primary database node at step 714. The takeover application ends process 700 thereafter.

Figure 9:
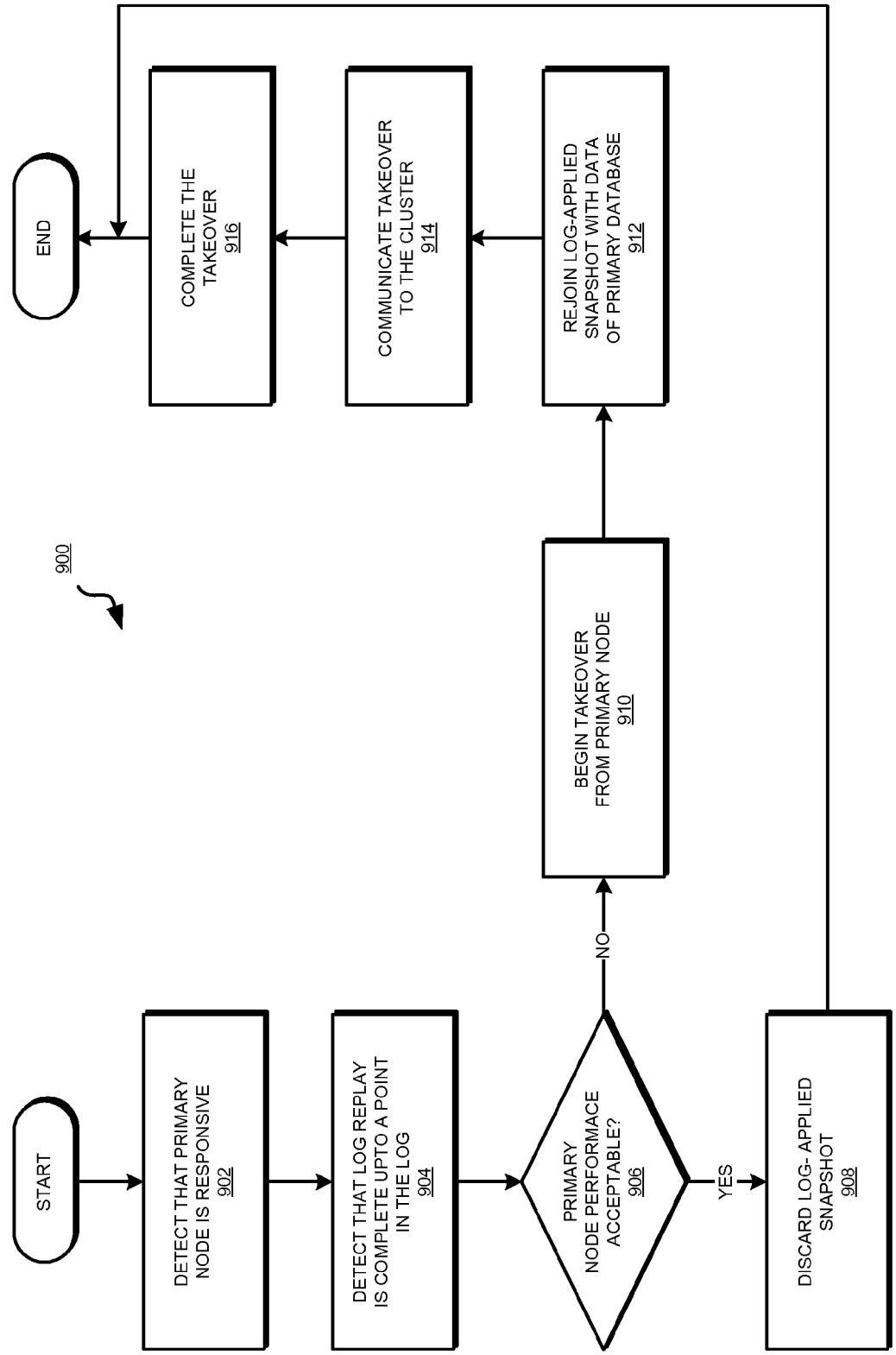
FIG. 9 depicts a flowchart of an example process for takeover determination in accordance with an illustrative embodiment.

Whether to abandon the log replay on the snapshot or to take over from the primary database node is a determination that the takeover application makes by considering a combination of several factors. Some example factors are described with respect to FIG. 6. Another example factor is depicted in FIG. 9.

These example factors are not intended to be limiting on the illustrative embodiments. Those of ordinary skill in the art will be able to conceive additional factors for determining whether to take over from the primary database node or abandon the log-applied snapshot, and the same are contemplated within the scope of the illustrative embodiments.

Figure 8:
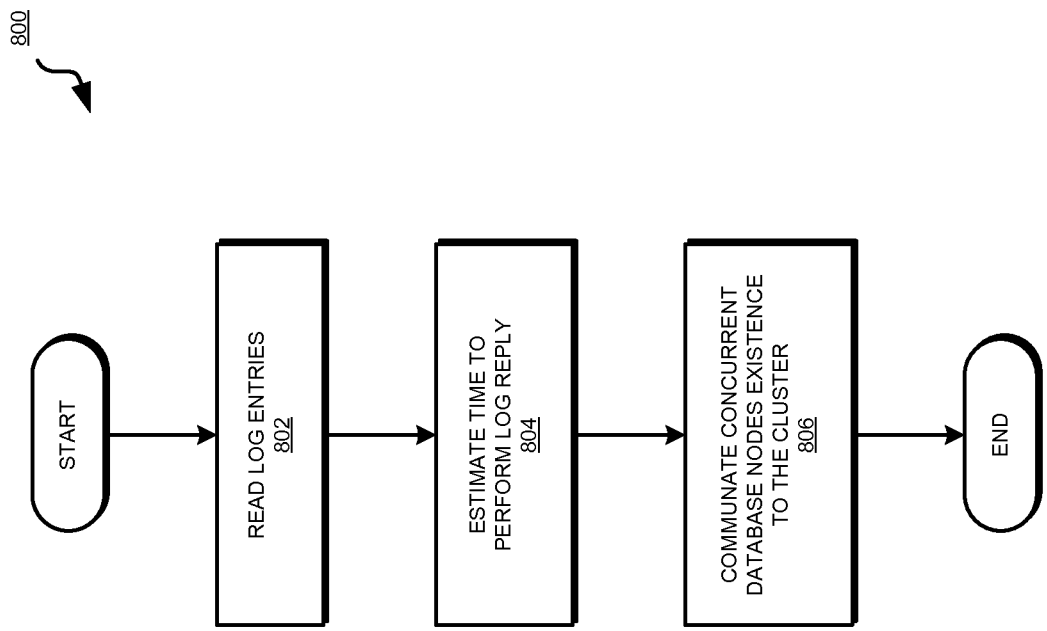
FIG. 8 depicts a flowchart of an example process of communicating database concurrency to a cluster in accordance with an illustrative embodiment.

With reference to FIG. 8, this figure depicts a flowchart of an example process of communicating database concurrency to a cluster in accordance with an illustrative embodiment. Process 800 can be implemented in takeover application 502 in FIG. 5.

A takeover application, operating in conjunction with a database instance according to an embodiment, begins by reading log entries from a database transaction log, such as log 500 in FIG. 6 (step 802). The takeover application estimates an amount of time log replay is expected to take for the log entries (step 804). In one embodiment, the takeover application that queries the database and communicates the estimate for the duration of log replay runs periodically on the node where the database is active. The last such estimate that has been successfully communicated to all nodes is confirmed in a multi-phase protocol that involves acknowledgement of receipt of updates by all nodes. Thus, the node that owns the database and sent the broadcast of the new estimate will know in case of a network partition whether all nodes have received the update. If not all nodes have acknowledged the estimated time for the concurrent phase, the node will not update its own value for the waiting period.

The takeover application communicates the activity of a concurrent database instance's existence to the cluster (step 806). The takeover application ends process 800 thereafter.

With reference to FIG. 9, this figure depicts a flowchart of an example process for takeover determination in accordance with an illustrative embodiment. Process 900 can be implemented in takeover application 502 in FIG. 5.

A takeover application, operating in conjunction with a database instance according to an embodiment, begins by detecting that the primary database node has become responsive again, after having detected a failure in the primary database node earlier (step 902). The takeover application detects that the log replay operation has been completed on a snapshot up to a certain point in the log (step 904). For example, in one embodiment, the point in the log is the log entry after which the snapshot was created. In another embodiment, the point in the log is a log entry some time prior to the time the snapshot was created.

The takeover application evaluates a combination of one or more factors to determine whether to take over from the primary database node. For example and without implying a limitation there to, in one embodiment, the takeover application determines, as one example factor, whether the performance of the primary database node, after having become responsive again, is acceptable according to some threshold measure of performance (step 906).

If the performance is acceptable ("Yes" path of step 906), the takeover application discards the log-applied snapshot, allowing the primary database node to remain the primary database node, and scrubbing a takeover in the cluster (step 908). The takeover application ends process 900 thereafter.

If the performance of the responsive primary database node is not acceptable ("No" path of step 906), the takeover application begins a takeover action to take over the primary database server role from the re-responsive current primary database node (step 910). The takeover application rejoins the log-applied snapshot with the database image data being used by the current primary database node, for example, in the manner described with respect to FIGS. 6A and 6B (step 912).

The takeover application communicates the takeover action to the cluster (step 914). The takeover application completes the takeover action (step 916). The takeover application ends process 900 thereafter.

FIGS. 10-A and 10-B are two parts of a continuous figure, FIG. 10-A followed by FIG. 10-B. With reference to FIG. 10-A, this figure depicts an example sequence of operations in an example high-availability implementation for speculative recovery using storage snapshot in a clustered database in accordance with an illustrative embodiment.

With reference to FIG. 10-B, this figure depicts an example sequence of operations in an example high-availability implementation for speculative recovery using storage snapshot in a clustered database in accordance with an illustrative embodiment. Sequence 1000-1050 is performed by example implementations of takeover application 502 in one or more of the depicted clustered nodes.

Three example nodes, Node-A, Node-B, and Node-C are shown clustered together for serving a database. Node-A is depicted as the current primary database node at the beginning of sequence 1000. An example false failure due to missing heartbeat from the primary database node is used in the illustration.

Actions performed only locally at a node are underlined under the node in that node's column. Distributed actions that use some coordination between a subset of the depicted cluster nodes by distributed protocols are not underlined and depicted across column lines. Further distributed actions or cluster wide events are depicted by horizontal lines across column lines. For instance, a sequence of distributed actions might start and end with a distributed action depicted by a horizontal line. A partitioned state, when cluster action on each partition occur without coordination is indicated by a vertical dotted line.

Sequence 1000-1050 illustrates a database managed by a high availability cluster in accordance with an illustrative embodiment. The database is part of resource group rg_1. Sequence 1000-1050 shows the cluster behavior of the three example nodes involved in the recovery of resource group rg_1 after a network partition condition that gives rise to the depicted failure. Note that the cluster domain might contain any number of additional nodes that play no active role in the depicted resource recovery. Sequence 1000-1050 depicts the steps in distributed cluster processing, such as domain merge protocols, state broadcasts and distributed decision making (voting) on the management of rg_1 and its resources. States for rg_1 include ONLINE—the resources of rg_1 are configured on the specified node. "rg_1@Node-C: ONLINE" indicates a broadcast that the state of rg_1 on node-C is "ONLINE". Further states include OFFLINE—the resources of rg_1 are not configured on the specified node, ACQUIRE—the resources of rg_1 are in the process of being acquired on the specified node, SAFE_CONCURRENT—the part of acquisition actions on rg_1 that can be performed safely while rg_1 may be in state ONLINE elsewhere, such as transaction log replay on a snapshot, SAFE_CONCURRENT_COMPLETE, —the actions to be performed while in state SAFE_CONCURRENT have been completed.

While resource group rg_1 is online on Node-A, a network partition occurs that renders Node-A unable to communicate with the other nodes. Recovery actions for rg_1 are described for different timing scenarios of termination of log replay in relation to rejoin of the network partition.

Two example situations are depicted in sequence 1000. The first situation, depicted in the top set of operations 9-10, is a general description of actions taken during a domain merge protocol that is run in response to heartbeats being received again from Node-A while log replay is ongoing. The second situation, depicted in the bottom set of operations 9-10, shows the case where the decision taken during the domain merge protocol entails leaving rg_1 on Node-A after the partition re-heals.

Two example situations are depicted in sequence 1050. The first situation is depicted in the top set of operations 9-10, where Node-A becomes responsive while log replay is ongoing but an actual takeover transpires due to Node-A's performance. Node-B performs log replay and later on continues with the acquisition of resources of rg_1. The second situation, depicted in the bottom set of operations starting with step 6, describes the scenario where heartbeats from Node-A are not received due to a network partition and the partition does not re-heal while Node-B is performing log replay. After completion of log replay, the remaining cluster nodes, Node-B and Node-C, exchange performance data to determine the optimal node to host rg_1 from here on. Node-C is determined to be the optimal node and acquires the resources of rg_1, step 10. The acquisition of resources involves setting reserves on the disks hosting the database, which causes Node-A to lose access to these disks. In response to losing disk access, Node-A which is operational brings the remaining resources offline.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a system, and computer program product are provided in the illustrative embodiments for speculative recovery using storage snapshot in a clustered database. An embodiment allows a primary database node a tunable or changeable speculative opportunity to recover from a failure over a period longer than a grace period for the heartbeat messages. During the speculative opportunity period, a takeover node processes the database transactions from a log onto a snapshot of the database data taken after the failure. An embodiment allows the primary database node to resume serving the database if the node recovers from the failure within the speculative opportunity period. An embodiment takes over the primary database node's role using the log-applied snapshot if the primary database node fails to recover from the failure within the speculative opportunity period, or recovers without the desired performance level.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a computer usable storage device including computer usable code for recovery in a database, the computer usable code comprising:
   computer usable code for detecting a failure in a first computing node, the first computing node serving the database in a cluster of computing nodes;
   computer usable code for creating, using a processor and a memory, a snapshot of data of the database;
   computer usable code for applying, using the processor and the memory, a subset of log entries to the snapshot, the applying modifying the snapshot to result in a modified snapshot;
   computer usable code for preserving an access of the first computing node to the data of the database; and
   computer usable code for aborting, responsive to receiving a signal of activity from the first computing node during the applying and after a grace period has elapsed, the applying such that the first computing node can continue serving the database in the cluster.

2. The computer usable program product of claim 1, further comprising:
   computer usable code for receiving the signal of activity from the first computing node during the applying and after the grace period for the signal of activity has elapsed;
   computer usable code for determining a level of performance of the first computing node;
   computer usable code for completing the applying responsive to the level of performance begin below a threshold; and
   computer usable code for taking over the serving of the database from the first computing node using the snapshot such that the first computing node cannot serve the database in the cluster.

3. The computer usable program product of claim 2, further comprising:
   computer usable code for combining the modified snapshot with a modified data of the database, wherein the modified data of the database results from the first computing node continuing to modify the data of the database after the creating of the snapshot.

4. The computer usable program product of claim 3, wherein the combining comprises a reverse copy operation.

5. The computer usable program product of claim 1, wherein the computer usable code is stored in a computer readable storage device in a data processing system, and wherein the computer usable code is transferred over a network from a remote data processing system.

6. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

7. A data processing system for recovery in a database, the data processing system comprising:
   a storage device, wherein the storage device stores computer usable program code; and
   a processor, wherein the processor executes the computer usable program code, and wherein the computer usable program code comprises:

computer usable code for detecting a failure in a first computing node, the first computing node serving the database in a cluster of computing nodes;

computer usable code for creating, using a processor and a memory, a snapshot of data of the database;

computer usable code for applying, using the processor and the memory, a subset of log entries to the snapshot, the applying modifying the snapshot to result in a modified snapshot;

computer usable code for preserving an access of the first computing node to the data of the database; and computer usable code for aborting, responsive to receiving a signal of activity from the first computing node during the applying and after a grace period has elapsed, the applying such that the first computing node can continue serving the database in the cluster.

* * * * *